(12) United States Patent
Chanturidze

(10) Patent No.: US 8,876,444 B1
(45) Date of Patent: Nov. 4, 2014

(54) DEPTH LIMITING DEVICE FOR A BORING TOOL

(76) Inventor: Besarion Chanturidze, Los Angeles, CA (US)

( * ) Notice: Subject to any disclaimer, the term of this patent is extended or adjusted under 35 U.S.C. 154(b) by 764 days.

(21) Appl. No.: 13/134,223

(22) Filed: May 31, 2011

Related U.S. Application Data

(60) Provisional application No. 61/396,768, filed on Jun. 2, 2010.

(51) Int. Cl.
*B23B 49/00* (2006.01)
*B23B 51/10* (2006.01)

(52) U.S. Cl.
CPC .............. *B23B 49/005* (2013.01); *B23B 51/104* (2013.01)
USPC .............................. 408/191; 408/192; 408/202

(58) Field of Classification Search
CPC .. B23B 51/104; B23B 2251/52; B23B 49/005
USPC ........ 408/202, 191, 192, 203, 241 S, 99, 100, 408/101, 110; 279/99–101
See application file for complete search history.

(56) References Cited

U.S. PATENT DOCUMENTS

| | | | |
|---|---|---|---|
| 1,095,185 A | 5/1914 | Broadbent | |
| 2,409,377 A * | 10/1946 | Miller | 408/112 |
| 2,823,563 A | 9/1956 | Nipken | |
| 2,794,353 A * | 6/1957 | Bashlow et al. | 408/113 |
| 3,000,239 A | 9/1961 | Ransom | |
| 4,811,843 A * | 3/1989 | Stribiak | 206/349 |
| 5,078,552 A | 1/1992 | Albel | |
| 5,341,704 A * | 8/1994 | Klemm | 81/429 |
| 5,482,410 A | 1/1996 | Chambers | |
| 5,795,110 A | 8/1998 | Wirth | |
| 5,882,151 A | 3/1999 | Wirth | |
| 6,499,381 B2 * | 12/2002 | Ladish et al. | 81/429 |
| 7,070,364 B2 * | 7/2006 | Weare | 408/1 R |
| 7,258,513 B2 | 8/2007 | Gertner | |
| 7,261,499 B2 * | 8/2007 | Mathis et al. | 408/202 |
| 7,264,427 B1 | 9/2007 | Kunz-Mujica | |
| 2007/0099150 A1 * | 5/2007 | Muller et al. | 433/165 |
| 2010/0067996 A1 * | 3/2010 | Hsu | 408/241 S |
| 2010/0172706 A1 | 7/2010 | Wirth | |
| 2010/0260565 A1 * | 10/2010 | Santamarina et al. | 408/110 |

FOREIGN PATENT DOCUMENTS

| | | | |
|---|---|---|---|
| DE | 19753574 A1 * | 7/1999 | |
| DE | 10154434 A1 | 6/2003 | |
| EP | 1782924 A1 * | 5/2007 | |
| EP | 2093001 A1 | 8/2009 | |
| JP | 03049807 A * | 3/1991 | |

* cited by examiner

*Primary Examiner* — Daniel Howell
*Assistant Examiner* — Nicole N Ramos

(57) ABSTRACT

A depth limiting device for a boring tool having stop collar includes housing and a sleeve. The housing provides snap on attachment onto the stop collar, allowing for a free axial rotation of the said housing around the body of the stop collar. The housing and the sleeve have a threaded engagement for adjusting position relative to one another and thereby adjusting length of the working portion of boring tool. Coupled housing and sleeve are freely rotatable with respect to the body of the stop collar and cease to rotate when operator achieves desirable depth of drilling and the device is pressed against the work-piece surface. The structural interrelationship prevents marring of the surface of the work-piece.

15 Claims, 9 Drawing Sheets

DEPTH LIMITING DEVICE FOR A BORING TOOL

CROSS-REFERENCE TO RELATED APPLICATIONS

This application claims the benefit of provisional patent application Ser. No. 61/396,768, filed 2010 Jun. 2 by the present inventor.

FEDERALLY SPONSORED RESEARCH

Not Applicable

SEQUENCE LISTING OR PROGRAM

Not Applicable

BACKGROUND

1. Field

This application relates to devices for controlling depth of penetration of rotary cutting tools into the work-piece in a manner that avoids any marring or damage to work-piece surface.

2. Prior Art

Depth limiting devices for rotary cutting tool, particularly for drill bits and countersink tools, having contacting structures providing free rotation relative to rotary cutting tool are known in the art.

U.S. Pat. No. 5,795,110 describes a drill stop collar having an independently rotatable plastic cap covering lower end of the stop collar. A device is selectively mounted along the drill bit at a position that limits the depth of penetration of the rotary cutting tool into the work-piece below then predetermined depth. A cap ceases to rotate when basically flat surface of the contacting portion of the cap comes into contact with work-piece and prevents surface of the work-piece from being marred.

U.S. Pat. No. 7,258,513 discloses a depth limiting device which includes a spindle and stop sleeve that is in the form of a cylindrical shell having a first end with opening and a contacting portion extending along the periphery of the opening in the direction of working section of the drill bit. A spindle extending axially through the stop sleeve includes a first end for attaching to a drilling machine, and a second end integrally formed as countersink tool with central bore for receiving and selectively fixing therein the drill bit, thereby providing adjustment of depth of penetration into the work-piece by the drill bit. Second end of the stop sleeve is permanently fixed on spindle in longitudinal position and freely axially rotates around the spindle and ceases to rotate when it contacts the work-piece without marring or otherwise damaging the work-piece. A stop sleeve which serves as abutment, limits further then predetermined penetration of the countersink tool and drill bit into the work-piece. Internal space of the stop sleeve communicates with opening, allowing debris to be inside the stop sleeve and reducing the presence of debris between contacting portion of stop sleeve and work-piece, thereby providing the accuracy of drilling. In addition, adjustment of penetration of the countersink tool into the work-piece provided by attachable to the contacting portion of stop sleeve of depth-adjusting members with varying thicknesses.

DE Pat. No. 10154434 describes a stop device having spindle with axial bore for receiving and longitudinally adjusting the drill bit and stop sleeve, which freely rotates with respect to spindle. Countersink tool which is a separate part of the device, has central aperture or bore for receiving the drill bit therein. Countersink tool can be slid along the drill bit to the required position and be secured by set screw. Thereby device provides depth adjustment for the drill bit and also for the countersink tool. However, if operator adjusts depth of penetration of the drill bit, as result it will further be necessary to readjust the countersink tool, since the letter is attached to the drill bit.

EP2093001 discloses device with a spindle including a first end for attaching to a drilling machine, and a second end integrally formed as a countersink tool with central bore for receiving and selectively fixing therein the drill bit thereby providing adjustment of the depth of penetration into the work-piece by drill bit. The spindle includes an external threaded portion for threaded engagement with a hollow elongated cylindrical member to which in turn rotatably attached is the stop sleeve. The operator screws the cylindrical member in or out relative to the spindle and cylindrical member coupled with stop sleeve axially moves relative to spindle, thereby exposing desirable distance between cutting edges of the countersink tool and contacting portion of the stop sleeve. When predetermined position is attained, cylindrical member is secured relative to spindle by set screw which extends through the body of cylindrical member to engage the spindle. Such design of the depth limiting device allows an operator to adjust the depth of penetration of the drill bit without disturbing the position of the countersink tool relative to stop sleeve.

It can be seen that U.S. Pat. No. 7,258,513, DE10154434 and EP2093001 include intermediate member such as a spindle having central bore, which correspondingly fits certain diameter of the drill bit and for a range of diameters of drill bits will be necessary a range of suitable devices. Moreover, spindles are preferably composed of metal, which requires different types of metalworking processes. Everything aforementioned ads complexity and increase the cost to manufacture the devices.

SUMMARY

The invention is related to devices for control and adjusts the depth of bore of the rotary cutting tool in a way that avoids any marring or damage the work-piece surface. According to present invention, rotatable tool-bit stop device provides quick tool-less attaching to such conventional units as stop collars with drill bits and countersink tools with drill bits, as well as to any rotatable tool-bit with suitable collar like formation and converts ordinary countersink tool or stop collar to an instrument with new properties. However, countersink tools themselves either stop collars or drill bits do not form a part of this invention.

First embodiment of present invention is formed as a single piece and includes housing having portal for receiving and releasably detaining therein stop collars or the like, and also integrally formed sleeve for engaging with the work-piece. Exposed out of the sleeve portion of the rotary cutting tool is defined depth of penetration into work-piece, which can be adjusted by sliding conventional stop collar or the like along body of rotary cutting tool and fixing it at a selected position. Depth limiting device freely rotates around the therein detained stop collar or the like and correspondingly around the axis of rotation of the drill bit. In process of drilling, when predetermined depth of penetration is achieved, device is pressed against the work-piece and ceases to rotate, preventing work-piece from being marred.

In accordance with the second embodiment of present invention, depth limiting device comprises housing and a sleeve, formed as single unitary pieces. Housing has a portal for receiving and releasably detaining therein stop collars or the like, which are coupled with a rotary cutting tool. Housing and sleeve have threaded engagement. Screwing housing in and out relative to sleeve operator can correspondingly expose out of lower end of the sleeve more or less length of rotary cutting tool, thereby providing fine adjustment to the desired depth of penetration in to the work-piece. For preventing unintended rotation of the sleeve relative to housing the device provides tool-less locking mechanism. However, locked relative to one another housing and sleeve are enabled to freely rotate with respect to the body of the stop collar. Device ceases to rotate when it contacts with work-piece, while rotary cutting tool continues spinning. This prevents work-piece surface from being marred or scratched.

Device can be snapped off of the rotary tool assembly in the direction of tool tip and then same device can be immediately snapped on to any other suitable rotary tool assembly, thereby providing convenience and flexibility of using a device for different application.

DRAWINGS—FIGURES

DETAILED DESCRIPTION

Figure 1:
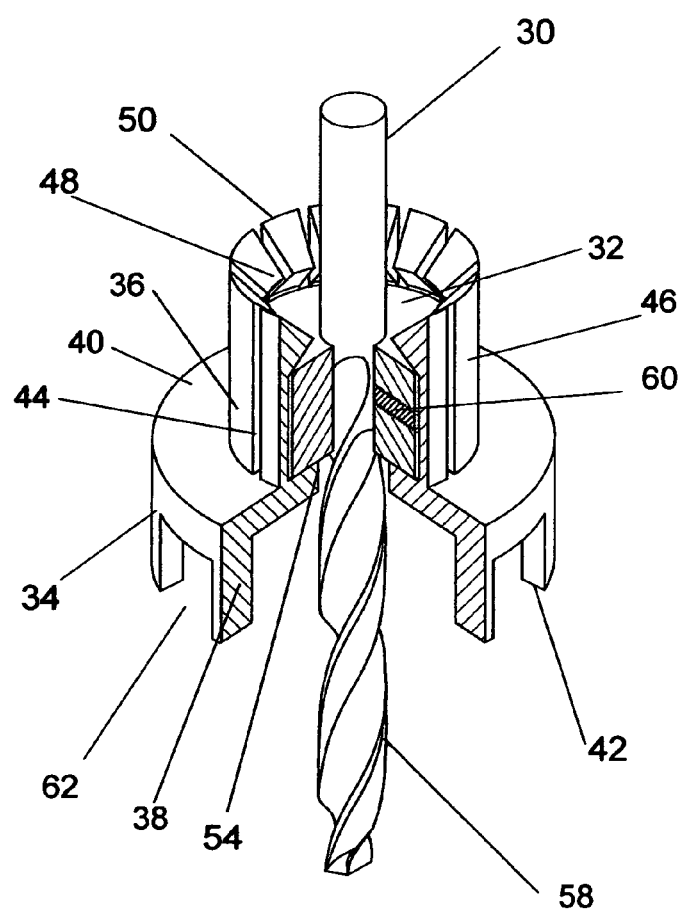
FIG. 1 is a perspective view partially in section of the first embodiment of the device with the stop collar and the drill bit.

According to the first embodiment of present invention FIG. 1 illustrates the elevation view of the Depth limiting device for a boring tool releasably mounted on a rotary cutting tool assembly, the latter comprised of the conventional drill bit 30 and also conventional stop collar 32. Device is preferably formed as one piece body molded from plastic and includes sleeve 34 and housing 36. Circumferential sidewall 38 of the sleeve 34 projects downward from the radial end of the external annular ridge 40, which substantially extends outward from lower external portion of the housing 36. Outermost lower end of the sleeve 34 comprises work-piece contacting portion 42 that contacts the surface of the work-piece. Housing 36 is radially interspaced by slits 44 forming axially oriented plurality of spring arms 46. Inner surface of the free upper end of the arms 46 are provided with inwardly extended detents 48 in vicinity of the portal 50 of the housing 36. Lower internal portion of the housing 36 contains integrally formed annular shoulder 52 (FIGS. 1, 2 and 3) with central aperture 54.

Figure 3:
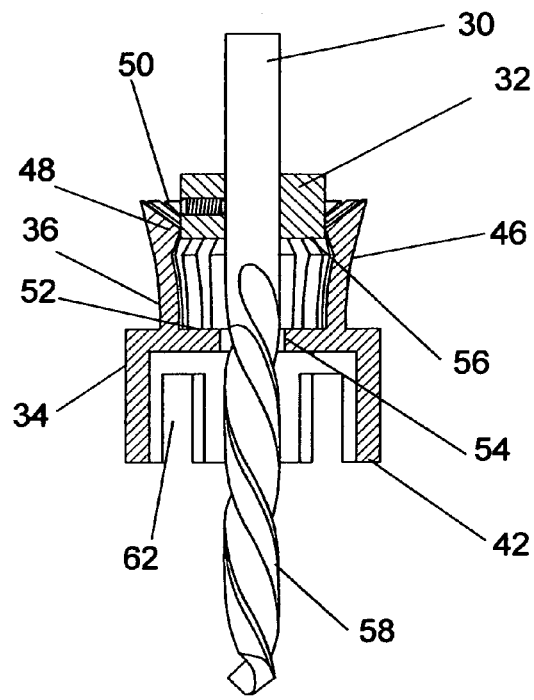
FIG. 3 is a longitudinal sectional view of the device showing the drill bit and the stop collar installed and engaging spring arms with stop collar.

While the arms 46 are in a normal position (FIG. 1) the distance between inwardly extending outermost edges of detents 48 (from apex to apex) is substantially smaller than outer diameter of the stop collar 32 and when stop collar 32, for example, coupled with drill bit 30 is introduced into portal 50 of the housing 36, detents 48 come to rest against lower outer surface of the stop collar 32 and spring arms 46 are deflected outwardly (FIG. 3). As drill bit 30 is continued to be pushed downward, housing 36 snaps on over the body of stop collar 32 by means of detents 48 due to the spring returning force of the arms 46. Further advance of the drill bit 30 into the housing 36 is limited by end face 56 of the stop collar 32 when end face 56 comes in contact with the internal surface of the annular shoulder 52. At the same time working portion 58 (FIG. 3) of the drill bit 30 is protruded through aperture 54 and further exposed out of work-piece contacting portion 42 of the sleeve 34. Distance between tip of the drill bit 30 and work-piece contacting portion 42 of the sleeve 34 defines depth of penetration of the drill bit into work-piece. Said depth can be adjusted by sliding stop collar 32, and correspondingly the device along the body of the drill bit 30, and fixing at a selected position by set screw 60.

According to present invention, device snaps on over the body of stop collar 32 in a loose-fitting condition and provides ability of free rotation of the device with respect to the body of the stop collar 32 about an axis of rotation of the drill bit 30. At the end of the process of drilling when the operator has achieved desirable depth of drilling and contacting portion 42 of the sleeve 34 is pressed against the work-piece surface, the device ceases to rotate, preventing the work-piece from being marred. The aforementioned is attained by using plastic with low coefficient of friction for device, and additionally by difference between the outer radius R1 (FIG. 2) of end face 56 and the external radius R2 of contacting portion 42, wherein the latter is substantially larger. Therefore the frictional force required for the immediate stoppage of rotation of the device is substantially less. The stop collar 32 coupled with drill bit 30 may continue to rotate, for instance, by inertia.

Figure 2:
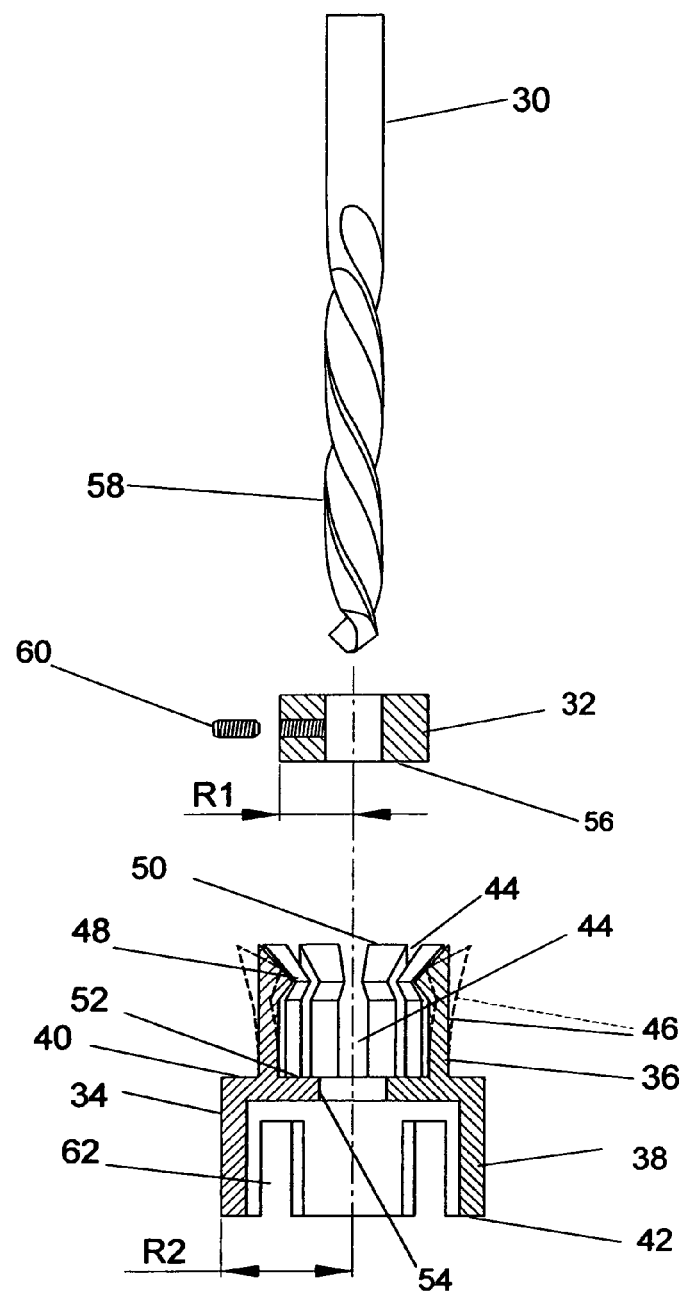
FIG. 2 is an exploded longitudinal sectional view of FIG. 1.

As shown in FIGS. 1, 2 and 3 the sleeve 34 can be provided with a series of openings 62 to allow debris, generated in the process of drilling, to be discharged from the cutting area. Otherwise, debris tend to be clogged inside said space of the sleeve 34 which can cause inaccurate drilling and interference with the free rotation of the device around the body of stop collar 32. Such interference can cause the sleeve 32 to mar the surface of the work-piece.

Figure 4:
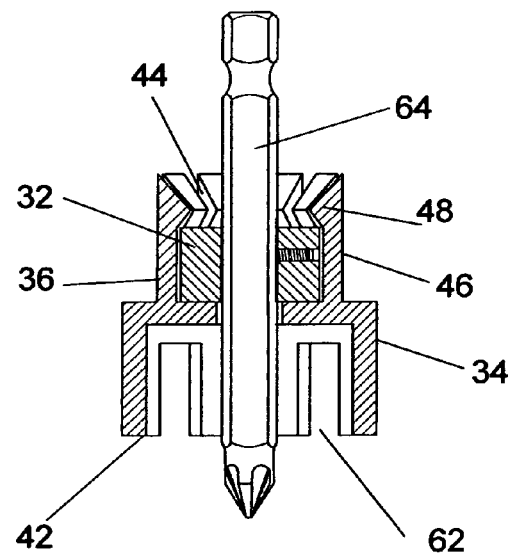
FIG. 4 is a longitudinal sectional view of the device with stop collar and screwdriver bit.

The same design of the device can be snapped onto different types of tools, including but not limited to conventional screwdriver bit 64 of a power tool (FIG. 4). With the device snapped on to the screwdriver bit (FIG. 4) operator is enabled to adjust the depth of penetration of the screw into work-piece. During the screwing operation, contacting portion 42 of the sleeve 34 contacts the surface of the work-piece and interrupts transmission of torque from screwdriver bit 64 to the screw (not shown) at predetermined final depth.

Figure 5:
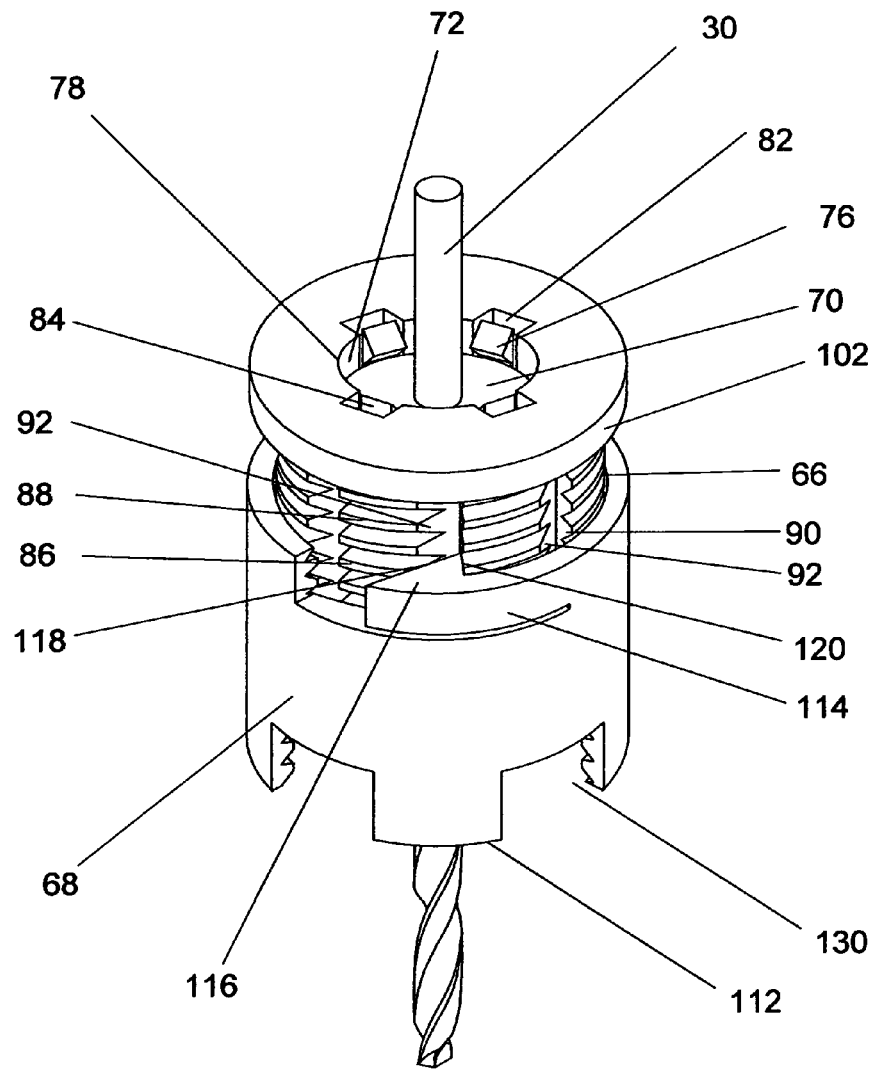
FIG. 5 is a perspective view of second embodiment of the device with adjustable sleeve with countersink tool and drill bit.

According to the second embodiment of the invention, FIG. 5 shows perspective view of the, depth limiting device for a boring tool having housing 66 and adjustable sleeve 68, each of which is made as a single piece, preferably by molding from plastic. However, they can also be produced by different methods and from a variety of materials. In this embodiment, the device is releasably mounted, for example, on a rotary cutting tool assembly which is comprised of conventional drill bit 30 and countersink tool 70 (FIG. 6).

Figure 7:
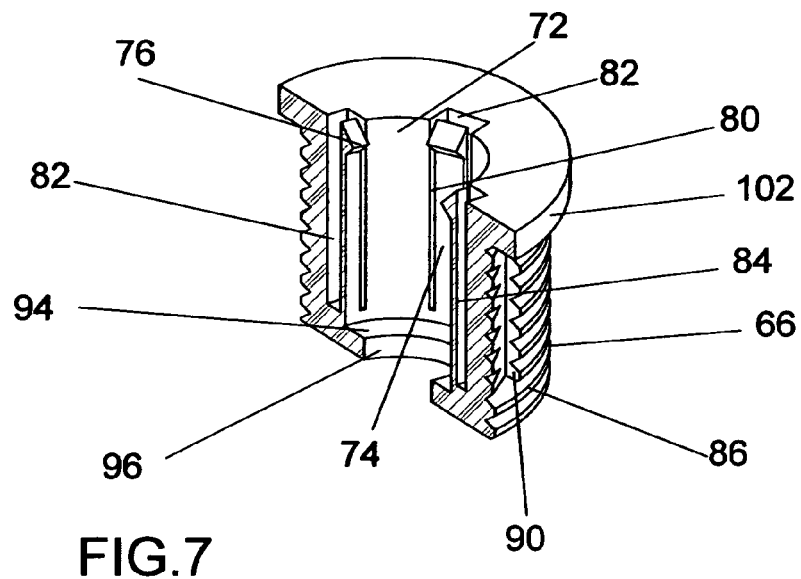
FIG. 7 is a longitudinal sectional perspective view of the housing.
Figure 10:
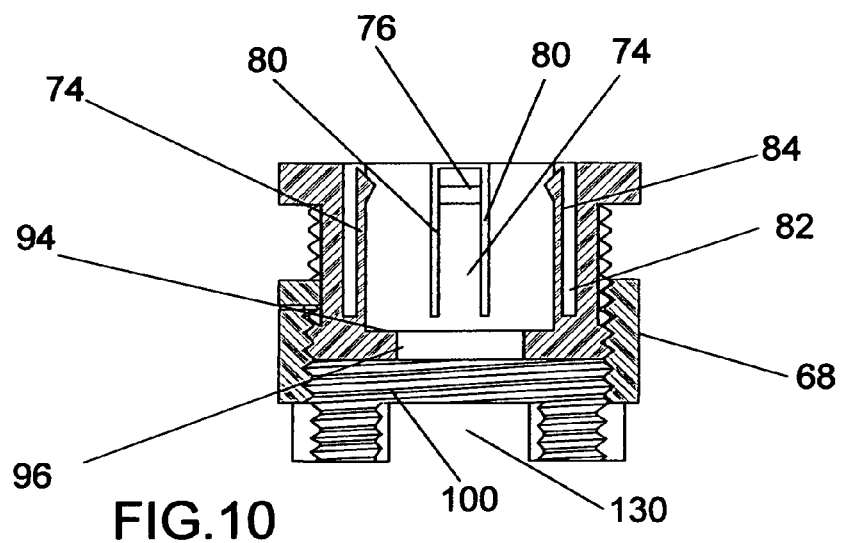
FIG. 10 is a longitudinal sectional view of the device.

In this embodiment the housing 66 is designed as an elongated cylindrical body with internal circumferential sidewall 72 having a plurality of spring arms 74 oriented axially, and radially interspaced. Each one of the arms 74 has a free end with detents 76 in vicinity of the portal 78 of the housing 66. Body of the arms 74 (FIGS. 7 and 10) is formed by separation from internal sidewall 72 by the side slits 80 and by cutout 82 which connects with side slits 80 and forms the outer or back side 84 of the arms 74 over the whole length of the arms 74. Spacing of the cutouts 82 in radial direction is such that outward deflection of the arms 74 provides positioning of furthermost inwardly extended portions of detents 76 (FIG. 16) from central axis at the same radial distance as the internal surface of the circumferential sidewall 72.

Figure 9:
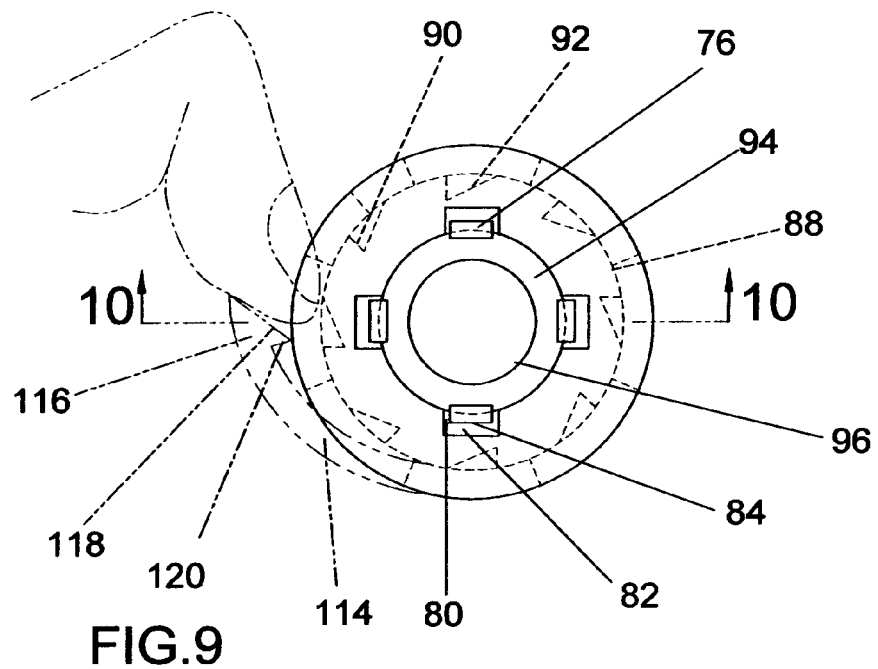
FIG. 9 is a top view of the device showing disengaged pawl and ratchet teeth and showing user's finger in phantom illustrating use thereof.

Outer cylindrical surface of housing 66 has external thread 86 and a plurality of longitudinal ratchet teeth 88 (FIGS. 5, 6, 7 and 9) which are equally interspaced around the housing 66. Ratchet teeth 88 are formed by retention surface 104 which is aligned approximately radially from the central axis of the housing 66 and by ramp surface 92, which is aligned approximately tangentially with the outer cylindrical surface of the housing 66. However, the alignments, or shape and number of the teeth can vary. Internal lower portion of the housing 66 provides annular shoulder 94 and central aperture 96 (FIGS. 7, 9 and 10) through which working portion 98 (FIGS. 6, 11) of the countersink tool 70 can be exposed. According to present invention, adjustable sleeve 68 provides internal thread 100 (FIG. 6) for engagement with the thread 86 of the housing 66 (FIGS. 5, 6 and 11) whose outer upper end may be comprised of outwardly extending flange 102.

Figure 6:
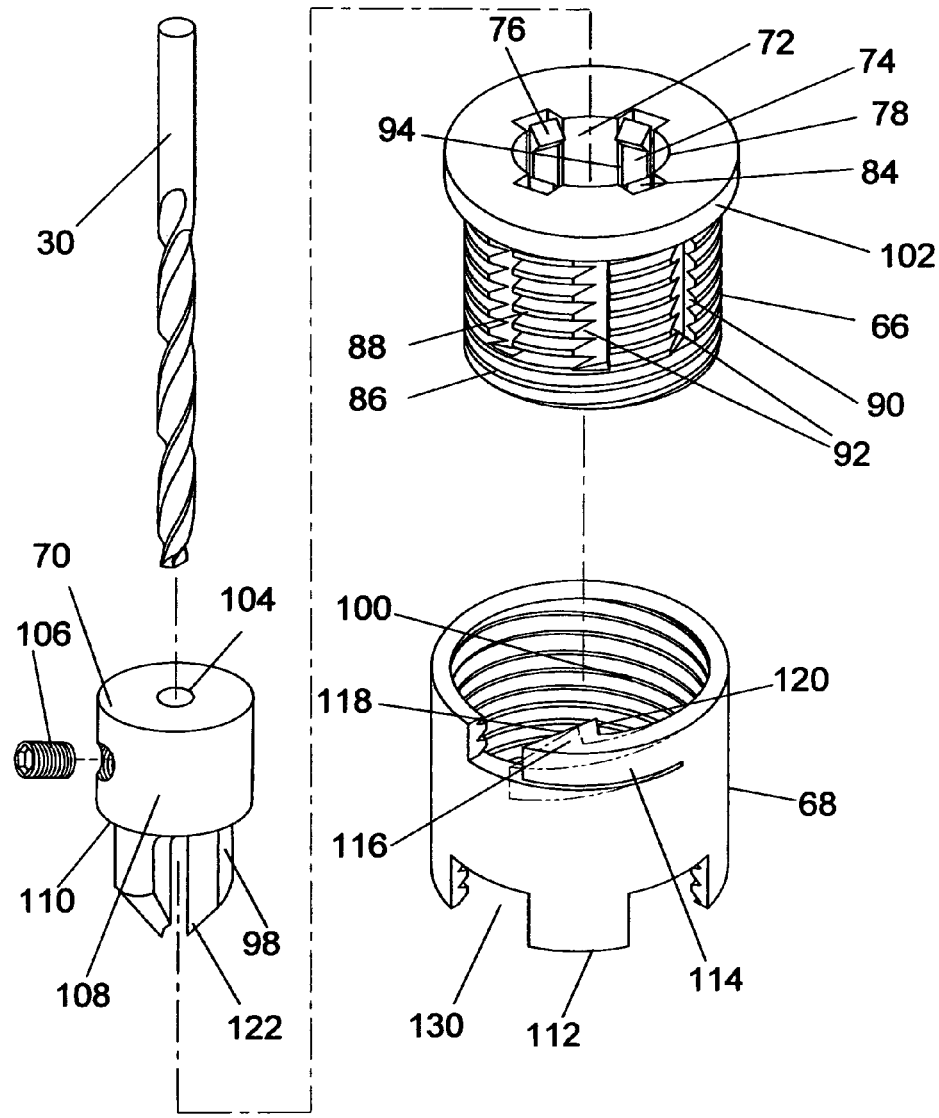
FIG. 6 is an exploded view of FIG. 5
Figure 13A:
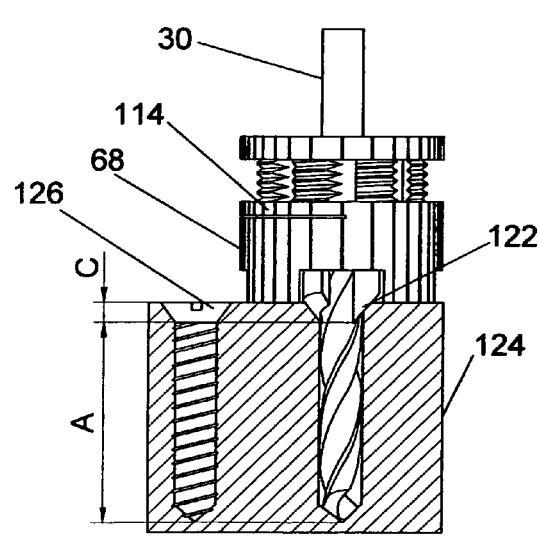
FIG. 13A and FIG. 13B illustrates different depths of penetration of the countersink and the drill bit into the work-piece.
Figure 13B:
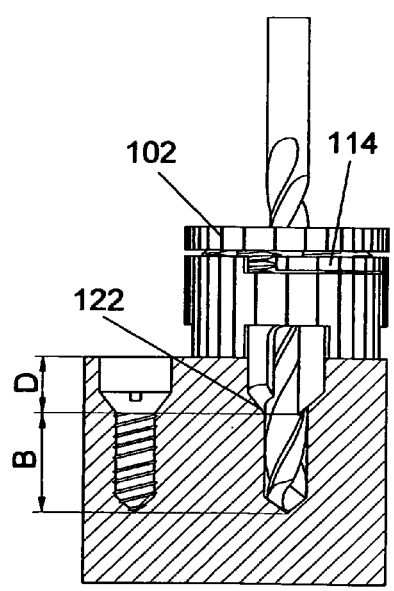

FIG. 6 shows a conventional drill bit 30, which can be inserted into central bore 104 of the conventional countersink tool 70 and then the latter can be slid along the drill bit 30 to the desired position and be secured by set screw 106 which extends through the mounting portion 108 of the countersink tool 70 to engage the drill bit 30. The aforesaid technique is designed to achieve varying depths of penetration of the drill bit below the countersink, examples of which are shown in FIGS. 13A and 13B as A and B accordingly.

Figure 11:
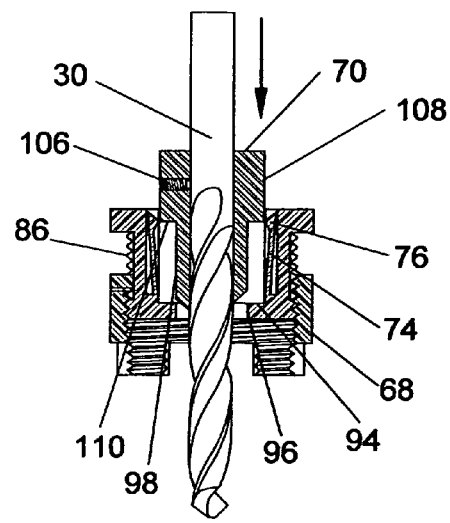
FIG. 11 is a longitudinal sectional view of the device showing tool-bit assembly installed into the device.
Figure 12:
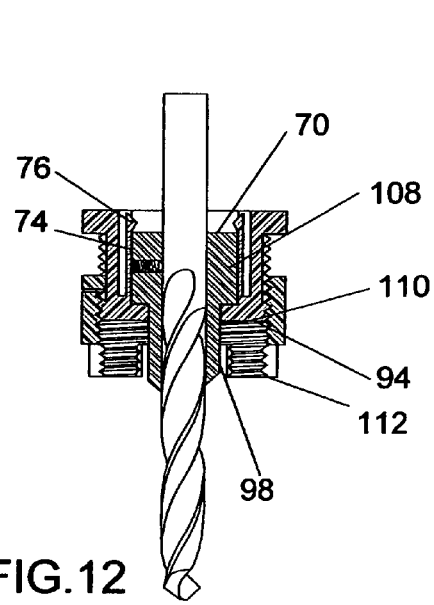
FIG. 12 is a longitudinal sectional view of the device with tool-bit assembly.

Further the rotary cutting tool assembly, which includes drill bit 30 and countersink tool 70, can be releasably coupled with depth limiting device for a boring tool by insertion of aforementioned tool assembly into housing 66 through the portal 78 (FIG. 11). While the arms 74 are in a normal position (FIGS. 7 and 12) the distance between inwardly extending outermost edges of detents 76 (from apex to apex) is substantially smaller then the diameter of the mounting portion 108 of the countersink tool 70 and when mounting portion 108 of countersink tool 70 coacts with detents 76, the arms 74 are deflected outwardly (FIG. 11). As rotary cutting tool or the like is continued to be pushed downward, the detents 76 slide over the body of the mounting portion 108 and then the latter is captured by detents 76 due to the spring returning force of the arms 74. At the same time, working portion of the countersink 98 is protruded through aperture 96 (FIG. 12). However, further advance of the rotary cutting tool into housing 66 is limited by end face 110 of the mounting portion 108 when end face 110 comes in contact with internal surface of the annular shoulder 94.

Detained inside housing 66, mounting portion 108 of the countersink tool 70 has a loose-fitting relationship in all directions and provides the ability of free rotation of housing 66 coupled with the adjustable sleeve 68 with respect to the body of mounting portion 108 of the countersink tool 70 about an axis of rotation of the aforesaid tool. At the end of the process of drilling, while rotary cutting tool continues to rotate and when operator has achieved a desirable depth of drilling, and correspondingly contacting portion 112 of the adjustable sleeve 68 is pressed against the work-piece, adjustable sleeve 68 and housing 66 coupled by threaded engagement, cease to rotate, preventing work-piece from being marred or being otherwise damaged. However, frictional engagement between annular shoulder 94 and the end face 110 of mounting portion of countersink tool 70 intends to rotate housing 66 relative to the adjustable sleeve 68 in a clockwise direction when using the right hand drill bit, which can cause an unintended change in the preselected depth of drilling. To prevent the rotation of housing 66 relative to adjustable stop sleeve 68, upper portion of the adjustable stop sleeve 68 possesses an integrally formed spring appendage 114 (FIGS. 5, 6 and 9) with a wedge-shaped pawl 116 which has a locking engagement with ratchet teeth 88 of the housing 68. To adjust depth of the countersink—to decrease the depth, for example—operator unscrews housing 66 in counterclockwise direction and adjustable sleeve 68 axially moves downward relative to housing 66, while the planar slanted surface 118 of the pawl 116 slides easily over the ramps 92 and over the tops of ratchet teeth 88. When desired position is achieved, pawl 116 by spring force of the appendage 114 protrudes into recess between teeth 88 and locks the clockwise direction of rotation of the housing 66 relative to the adjustable stop sleeve 68 by engagement of securing ridge 120 of the pawl 116 and retention surface 90 of one of the ratchet teeth 88. Depth of the countersink is defined as a distance between contacting portion 112 of the stop sleeve 68 and lowest portion of cutting edges 122 of the countersink tool 70. FIG. 13A illustrates depth of the countersink (C) bored into the work-piece 124 to an approximate depth required for installation of a screw head 125 flush with the work-piece surface.

For increasing the depth of the countersink, the operator disengages securing ridge 120 of the pawl 116 and the retention surface 90 of ratchet teeth 88 by deflecting outwardly spring appendage 114 (FIG. 9) and turning housing 66 in a clockwise direction. When desired position is achieved, the operator frees appendage 114 and pawl 116 returns to a locking cooperation with ratchet teeth 88. FIG. 13B shows increasing depth of the countersink into the work-piece (shown as D).

Figure 8:
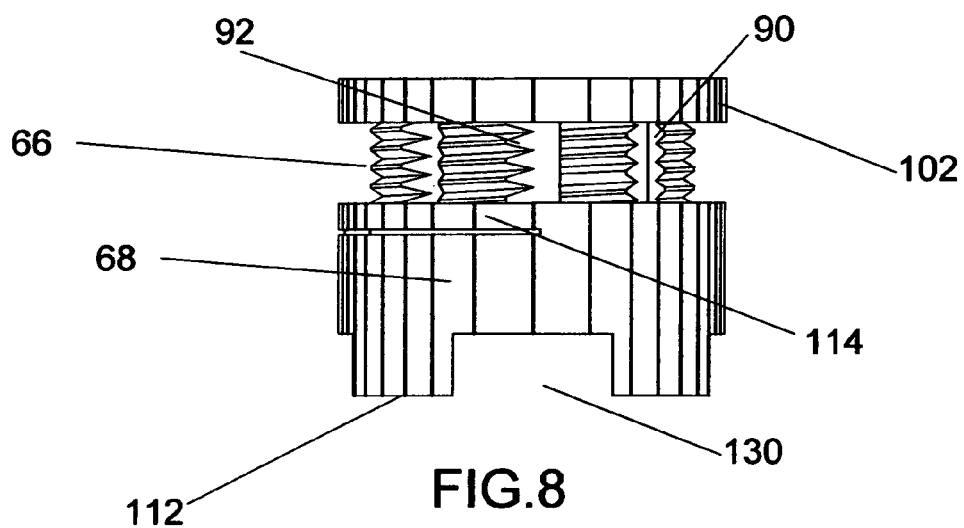
FIG. 8 is an elevation view of the device showing external surface of the flange and sleeve with the knurls.

The outer peripheral edge of the flange 102 and external surface 128 of the adjustable sleeve 68 may be knurled (FIG. 8) or may a different geometrical shape for better assistance to the operator in gripping and turning housing 66 and adjustable sleeve 68 relative to one another. In addition, lower portion of the adjustable sleeve 68 can be provided with a series of radial openings 130 to allow debris to be discharged from the cutting area.

Figure 14:
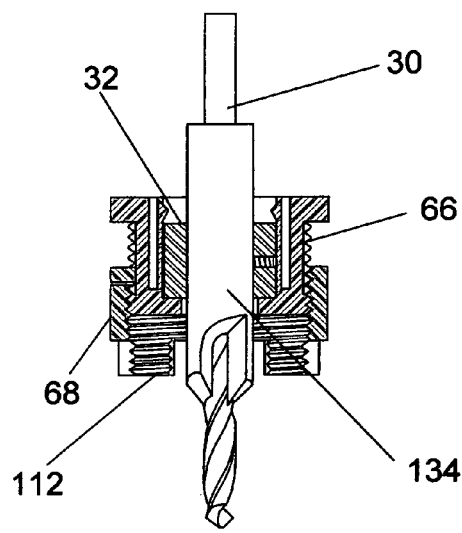
FIG. 14 shows device attached to another type of countersink tool with stop collar.
Figure 16:
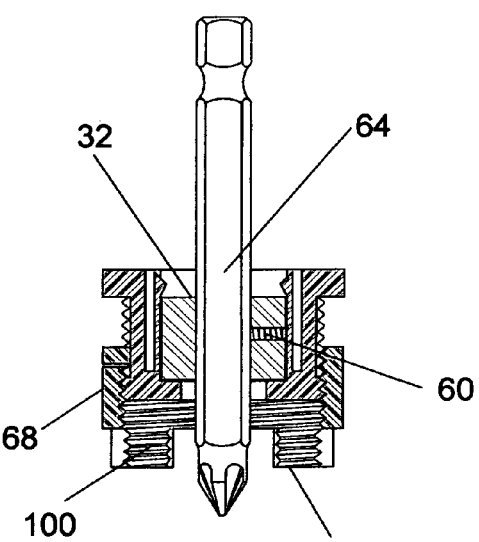
FIG. 16 shows device attached to the conventional stop collar with screwdriver bit.
Figure 15:
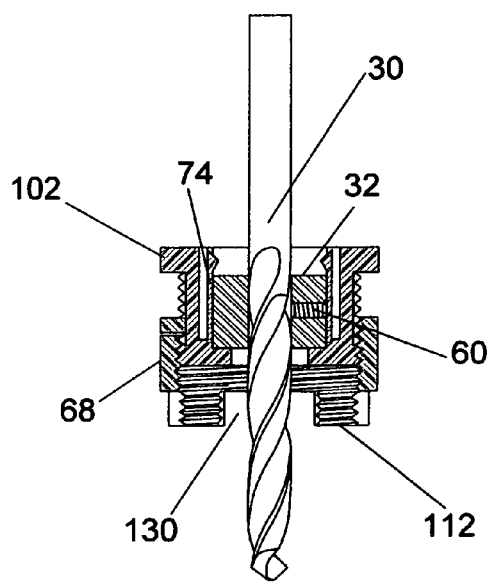
FIG. 15 shows device attached to the conventional stop collar with drill bit.

FIGS. 14, 15 and 16 show that the device can be attached to conventional stop collars 32 with different types of tools such as countersink tool 134 (FIG. 14), drill bit 30 (FIG. 15) and screwdriver bit 64 (FIG. 16). According to present invention, tool-less fine depth adjustment can be provided by rotating the adjustable sleeve 68 relative to housing 66 and consequently changing axial distance between, for example, tip of drill bit 30 and contacting portion 122 of the adjustable sleeve 68.

All embodiments of the devise can be snapped off of the rotary tool assembly in direction of the tool tip and then the same device as described above can be immediately snapped on to any other suitable rotary tool assembly, thereby providing convenience and flexibility of using the device for various applications.

It is apparent that the preferred embodiments described hereinabove are given by example only and that a person skilled in the art could make changes and modifications without departing from spirit and scope of the present invention as defined in the appended claims.

I claim:

1. A depth limiting device for a boring tool for attachment to a drill bit or driver bit having a collar secured thereto, comprising:
   a housing, said housing having external threads, said housing having an aperture for receiving the tool bit and a portal for receiving the tool bit and the collar therein, said housing having ratchet teeth; and
   a sleeve having internal threads for mating with said external threads in order to removably interconnect said housing and said sleeve to enable relative rotation between said housing and said sleeve in order to adjust longitudinal length of the device and thereby travel or depth distance parameter of the stop function afforded by the device, said sleeve having a pawl for engaging a selected one of said ratchet teeth in order to retain the device in a desired position of adjustment, said sleeve having contacting portion for contacting a work-piece when the tool bit is operationally moved against the work-piece and to the stop position during operational rotation thereof to thereby enable desired stop function.

2. The device of claim 1 wherein said sleeve includes a spring appendage, said pawl located at an outer end of said appendage, said spring appendage radially movable and providing positive engagement of said pawl with said ratchet teeth by means of spring force provided by said spring appendage.

3. The device of claim 2 wherein said spring appendage is composed of a plastic material having memory to enable said pawl to move into a position of engagement with said ratchet teeth after finger disengagement thereof or disengagement via relative rotation of said housing and said sleeve.

4. The device of claim 1 wherein said pawl includes a planar slanted surface to provide a finger grip surface to allow finger disengagement of said pawl from said ratchet.

5. The device of claim 1 wherein said pawl includes a planar slanted surface to allow outward radial movement of said pawl and thereby disengagement of said pawl from said ratchet teeth during one direction of relative rotation of said housing and said sleeve to facilitate adjustment of the travel or depth distance parameter.

6. The device of claim 1 wherein said housing includes a shoulder for engaging the tool bit collar to block downward movement of the tool bit and the collar when tool bit contacts the work-piece and to position the tool bit and the collar in said housing.

7. The device of claim 1 wherein said sleeve includes a plurality of openings at lower end portion thereof for allowing emission of drilling debris therethrough during operational rotation of the boring tool bit.

8. The device of claim 1 wherein said cylindrical housing is and said portal dimensioned so that the tool bit collar fits therein with sufficient clearance to allow free movement of the tool bit and the collar within said housing to enhance smooth rotational movement of the tool bit within the device.

9. A device for attachment to a drill bit or driver bit having a collar secured thereto, comprising:
   a housing, said housing having external threads, said housing having an aperture for receiving the tool bit and a portal for receiving the tool bit and the collar therein, said housing having spring arms having detents extending into portal area for blocking vertically upward movement of the tool bit and the tool bit collar, said spring arms and said detents being radially movable so that insertion of the tool bit collar into said portal deflects said spring arms pushes said detents out of said portal to allow unimpeded entry of the tool bit collar into said portal, said spring arms having a spring force providing retraction of said detents into said portal when not subjected to a radially outward force produced by insertion of the tool bit collar in said portal; and
   a sleeve having internal threads for mating with said external threads in order to removably interconnect said housing and said sleeve to enable relative rotation between said housing and said sleeve to adjust longitudinal length of the device and thereby travel or depth distance parameter of stop function afforded by the device, said sleeve having contacting portion for contacting a workpiece when the tool bit is moved against the work-piece and to the stop position during operational rotation to thereby enable desired stop function.

10. The device of claim 9 wherein said spring arms are composed of a plastic material having memory to enable said detents to move into said portal when not subjected to a radially outward force produced by insertion of the tool bit collar into said portal.

11. The device of claim 9 wherein said housing includes a shoulder for engaging the tool bit collar to block downward movement of the tool bit and the collar and to position the tool bit and the collar in said housing when said sleeve having contacting portion contacts the work-piece.

12. The device of claim 9 wherein said sleeve includes a plurality openings at lower end portion thereof for allowing emission of drilling debris therethrough during operational rotation of the boring tool bit.

13. The device of claim 9 wherein said cylindrical housing is and said portal dimensioned so that the tool bit collar fits therein with sufficient clearance to allow free movement of the tool bit and the collar within said housing to enhance smooth rotational movement of the tool bit within the device.

14. A depth limiting device for boring tool for attachment to a drill bit or driver bit having a collar secured thereto, comprising:
   a housing, said housing having an external thread, said housing having an aperture for receiving the tool bit therein and a portal for receiving the tool bit and the collar therein, said housing having ratchet teeth, said housing having spring arms having detents located at upper end portions thereof and extending into aperture area for blocking vertically upward movement of the tool bit and the tool bit collar, said spring arms and said detents being radially movable so that insertion of the tool bit collar into the portal pushes said detents out of the portal to allow unimpeded entry of the drill collar therein, said spring arms having a spring force providing retraction of said detents into the portal when not subjected to a radially outward force produced by insertion of the drill bit collar in the portal; and
   a sleeve having internal threads for mating with said external threads in order to removably interconnect said housing and said sleeve to enable relative rotation between said housing and said sleeve to adjust longitudinal length of the device and thereby travel or depth distance parameter of the stop function afforded by the device, said sleeve having a pawl for engaging a selected on of said ratchet teeth in order to retain the device in a desired adjustment position, said sleeve having contacting portion for contacting a work-piece when the tool bit is moved against the work-piece and to stop position during operational rotation of the tool bit to thereby enable the desired stop function.

15. The device of claim 14 wherein said housing includes a shoulder for engaging the tool bit collar to block downward movement of the tool bit and the collar and to position the tool bit and the collar in said housing when said sleeve having contacting portion contacts the work-piece.

\* \* \* \* \*